(12) United States Patent
Kumar (10) Patent No.: US 12,095,935 B2
(45) Date of Patent: Sep. 17, 2024

(54) METHOD AND SYSTEM FOR FACILITATING A ROBUST COMMERCIAL CATALOG SERVICE

(71) Applicant: JPMorgan Chase Bank, N.A., New York, NY (US)

(72) Inventor: Lakshmi Kumar, Edison, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 339 days.

(21) Appl. No.: 17/660,730

(22) Filed: Apr. 26, 2022

(65) Prior Publication Data

US 2023/0344657 A1  Oct. 26, 2023

(51) Int. Cl.
*H04L 9/00* (2022.01)
*G06Q 10/0631* (2023.01)
*H04L 41/5003* (2022.01)

(52) U.S. Cl.
CPC .......... *H04L 9/50* (2022.05); *G06Q 10/06313* (2013.01); *H04L 41/5003* (2013.01); *G06Q 2220/12* (2013.01)

(58) Field of Classification Search
CPC . H04L 9/50; H04L 41/5003; G06Q 10/06313; G06Q 2220/12
USPC ....................................................... 713/168
See application file for complete search history.

(56) References Cited

U.S. PATENT DOCUMENTS

| | | | |
|---|---|---|---|
| 11,646,900 B2 * | 5/2023 | Ratakonda | H04L 9/3297 |
| | | | 713/178 |
| 11,874,804 B2 * | 1/2024 | Novotny | G06F 16/1837 |
| 11,876,801 B2 * | 1/2024 | Smith | H04L 9/3265 |
| 2020/0177373 A1 * | 6/2020 | Komandur | H04L 9/0894 |
| 2021/0256009 A1 * | 8/2021 | Zhang | H04L 9/3239 |
| 2022/0069976 A1 * | 3/2022 | Yellick | H04L 41/0873 |
| 2023/0069078 A1 * | 3/2023 | Pennington | G06Q 20/3823 |
| 2023/0281583 A1 * | 9/2023 | Jakobsson | H04L 67/306 |
| | | | 705/67 |

* cited by examiner

*Primary Examiner* — Samson B Lemma
(74) *Attorney, Agent, or Firm* — Greenblum & Bernstein, P.L.C.

(57) ABSTRACT

A method for facilitating a distributed catalog service via a federated blockchain is disclosed. The method includes receiving, via an initiator, a submission, the initiator corresponding to a node from among a plurality of nodes of a distributed ledger; validating, via a validator, the submission, the validator corresponding to another node from among the plurality of nodes of the distributed ledger; determining whether a threshold is satisfied based on a result of the validating; initiating an action when the threshold is satisfied, the action including a modification of the distributed ledger at each of the plurality of nodes according to the submission; and notifying subscribers to the distributed ledger.

17 Claims, 5 Drawing Sheets

METHOD AND SYSTEM FOR FACILITATING A ROBUST COMMERCIAL CATALOG SERVICE

BACKGROUND

1. Field of the Disclosure

This technology generally relates to methods and systems for a catalog service, and more particularly to methods and systems for facilitating a distributed catalog service that manages enriched asset data via a federated blockchain.

2. Background Information

Many business entities utilize a commercial catalog service to facilitate the management of assets such as, for example, software assets and hardware assets. Often, effective management requires consistent registration of the assets based on current, accurate, and comprehensive asset information in the commercial catalog service. Historically, conventional implementations of the commercial catalog service have resulted in varying degrees of success with respect to data quality gaps relating to missing asset data, inconsistent asset metadata, and missing asset records.

One drawback of using the conventional implementations is that in many instances, the commercial catalog services are provided by a plurality of data providers and is generally based on core technical capabilities of the assets. As such, the commercial catalog service taxonomies vary across each of the plurality of data providers and asset data is not available at a granular level. Additionally, because each business entity must individually enrich the asset data in the commercial catalog service to address the data quality gaps, the enriched asset data are often not available for external consumption.

Therefore, there is a need for a robust commercial catalog service that manages enriched asset data via a federated blockchain to provide a single, reliable source of asset information that is current, accurate, and comprehensive.

SUMMARY

The present disclosure, through one or more of its various aspects, embodiments, and/or specific features or sub-components, provides, inter alia, various systems, servers, devices, methods, media, programs, and platforms for facilitating a distributed catalog service that manages enriched asset data via a federated blockchain.

According to an aspect of the present disclosure, a method for facilitating a distributed catalog service via a blockchain is disclosed. The method is implemented by at least one processor. The method may include receiving, via at least one initiator, at least one submission, the at least one initiator may correspond to at least one node from among a plurality of nodes of a distributed ledger; validating, via at least one validator, the at least one submission, the at least one validator may correspond to at least one other node from among the plurality of nodes of the distributed ledger; determining whether at least one threshold is satisfied based on a result of the validating; initiating at least one action when the at least one threshold is satisfied, the at least one action may include a modification of the distributed ledger at each of the plurality of nodes according to the at least one submission; and notifying at least one subscriber of the distributed ledger.

In accordance with an exemplary embodiment, to notify the at least one subscriber, the method may further include generating at least one alert for each of the at least one subscriber, the at least one alert may include information that relates to the initiated at least one action; refreshing at least one cache with the modified distributed ledger based on a service level agreement that corresponds to each of the at least one subscriber; and transmitting the at least one alert to the at least one subscriber.

In accordance with an exemplary embodiment, the at least one cache may be segmented into at least one data delivery tier based on the service level agreement, the at least one data delivery tier may include an immediate data delivery tier, a weekly data delivery tier, a monthly data delivery tier, and a quarterly data delivery tier.

In accordance with an exemplary embodiment, the at least one submission may relate to a request to manipulate data in the distributed ledger, the request may include evidence data and at least one from among a first request to add a new data item to the distributed ledger and a second request to update an existing data item in the distributed ledger.

In accordance with an exemplary embodiment, the at least one submission may be verified by the at least one initiator prior to the receiving.

In accordance with an exemplary embodiment, the distributed ledger may correspond to a federated blockchain that includes a plurality of pre-selected participants, the plurality of pre-selected participants may include the at least one initiator and the at least one validator.

In accordance with an exemplary embodiment, the at least one submission may be validated based on at least one predetermined guideline and evidence data from the at least one submission.

In accordance with an exemplary embodiment, the result of the validation may include at least one from among an approval response, a rejection response, and an abstention response from the at least one validator.

In accordance with an exemplary embodiment, the at least one threshold may include a predetermined number of approvals from the at least one validator that indicate a consensus of the plurality of nodes.

According to an aspect of the present disclosure, a computing device configured to implement an execution of a method for facilitating a distributed catalog service via a blockchain is disclosed. The computing device including a processor; a memory; and a communication interface coupled to each of the processor and the memory, wherein the processor may be configured to receive, via at least one initiator, at least one submission, the at least one initiator may correspond to at least one node from among a plurality of nodes of a distributed ledger; validate, via at least one validator, the at least one submission, the at least one validator may correspond to at least one other node from among the plurality of nodes of the distributed ledger; determine whether at least one threshold is satisfied based on a result of the validating; initiate at least one action when the at least one threshold is satisfied, the at least one action may include a modification of the distributed ledger at each of the plurality of nodes according to the at least one submission; and notify at least one subscriber of the distributed ledger.

In accordance with an exemplary embodiment, to notify the at least one subscriber, the processor may be further configured to generate at least one alert for each of the at least one subscriber, the at least one alert may include information that relates to the initiated at least one action; refresh at least one cache with the modified distributed ledger based on a service level agreement that corresponds to each of the at least one subscriber; and transmit the at least one alert to the at least one subscriber.

In accordance with an exemplary embodiment, the processor may be further configured to segment the at least one cache into at least one data delivery tier based on the service level agreement, the at least one data delivery tier may include an immediate data delivery tier, a weekly data delivery tier, a monthly data delivery tier, and a quarterly data delivery tier.

In accordance with an exemplary embodiment, the at least one submission may relate to a request to manipulate data in the distributed ledger, the request may include evidence data and at least one from among a first request to add a new data item to the distributed ledger and a second request to update an existing data item in the distributed ledger.

In accordance with an exemplary embodiment, the processor may be further configured to verify the at least one submission via the at least one initiator prior to the receiving.

In accordance with an exemplary embodiment, the distributed ledger may correspond to a federated blockchain that includes a plurality of pre-selected participants, the plurality of pre-selected participants may include the at least one initiator and the at least one validator.

In accordance with an exemplary embodiment, the processor may be further configured to validate the at least one submission based on at least one predetermined guideline and evidence data from the at least one submission.

In accordance with an exemplary embodiment, the result of the validation may include at least one from among an approval response, a rejection response, and an abstention response from the at least one validator.

In accordance with an exemplary embodiment, the at least one threshold may include a predetermined number of approvals by the at least one validator that indicate a consensus of the plurality of nodes.

According to an aspect of the present disclosure, a non-transitory computer readable storage medium storing instructions for facilitating a distributed catalog service via a blockchain is disclosed. The storage medium including executable code which, when executed by a processor, may cause the processor to receive, via at least one initiator, at least one submission, the at least one initiator may correspond to at least one node from among a plurality of nodes of a distributed ledger; validate, via at least one validator, the at least one submission, the at least one validator may correspond to at least one other node from among the plurality of nodes of the distributed ledger; determine whether at least one threshold is satisfied based on a result of the validating; initiate at least one action when the at least one threshold is satisfied, the at least one action may include a modification of the distributed ledger at each of the plurality of nodes according to the at least one submission; and notify at least one subscriber of the distributed ledger.

In accordance with an exemplary embodiment, to notify the at least one subscriber, the executable code, when executed by the processor, may further cause the processor to generate at least one alert for each of the at least one subscriber, the at least one alert may include information that relates to the initiated at least one action; refresh at least one cache with the modified distributed ledger based on a service level agreement that corresponds to each of the at least one subscriber; and transmit the at least one alert to the at least one subscriber.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
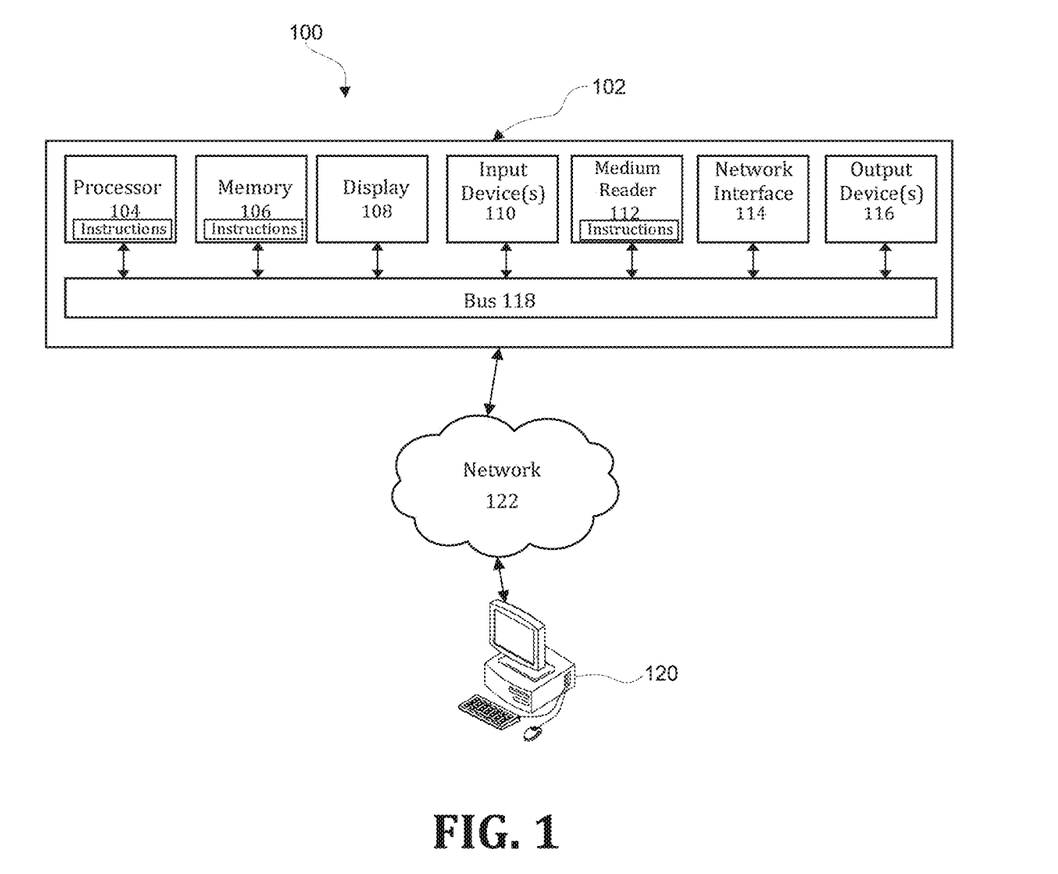
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating a distributed catalog service that manages enriched asset data via a federated blockchain.

Figure 2:
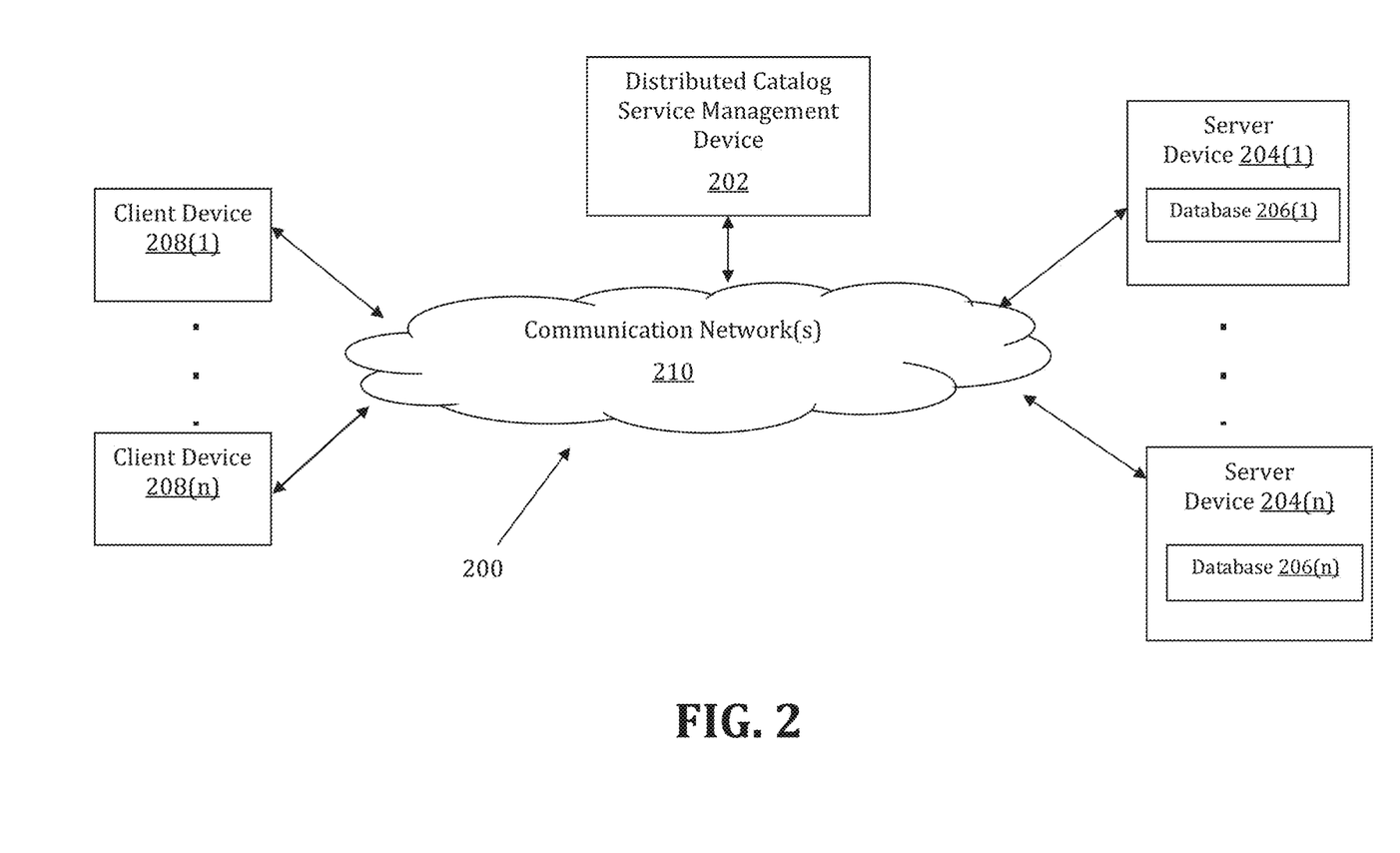
FIG. 2 illustrates an exemplary diagram of a network environment.

Referring to FIG. 2, a schematic of an exemplary network environment 200 for implementing a method for facilitating a distributed catalog service that manages enriched asset data via a federated blockchain is illustrated. In an exemplary embodiment, the method is executable on any networked computer platform, such as, for example, a personal computer (PC).

The method for facilitating a distributed catalog service that manages enriched asset data via a federated blockchain may be implemented by a Distributed Catalog Service Management (DCSM) device 202. The DCSM device 202 may be the same or similar to the computer system 102 as described with respect to FIG. 1. The DCSM device 202 may store one or more applications that can include executable instructions that, when executed by the DCSM device 202, cause the DCSM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DCSM device 202 itself, may be located in virtual server(s) running in a cloud-based computing environment rather than being tied to one or more specific physical network computing devices. Also, the application(s) may be running in one or more virtual machines (VMs) executing on the DCSM device 202. Additionally, in one or more embodiments of this technology, virtual machine(s) running on the DCSM device 202 may be managed or supervised by a hypervisor.

In the network environment 200 of FIG. 2, the DCSM device 202 is coupled to a plurality of server devices 204(1)-204(n) that hosts a plurality of databases 206(1)-206(n), and also to a plurality of client devices 208(1)-208(n) via communication network(s) 210. A communication interface of the DCSM device 202, such as the network interface 114 of the computer system 102 of FIG. 1, operatively couples and communicates between the DCSM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DCSM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DCSM devices that efficiently implement a method for facilitating a distributed catalog service that manages enriched asset data via a federated blockchain.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DCSM device 202 may be a standalone device or integrated with one or more other devices or apparatuses, such as one or more of the server devices 204(1)-204(n), for example. In one particular example, the DCSM device 202 may include or be hosted by one of the server devices 204(1)-204(n), and other arrangements are also possible. Moreover, one or more of the devices of the DCSM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DCSM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to submissions, evidence data, nodes, distributed ledgers, blockchains, thresholds, actions, caches, notifications, alerts, and subscribers.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DCSM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DCSM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DCSM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DCSM device 202, the server devices 204(1)-204(n), or the client devices 208(1)-208(n), for example, may be configured to operate as virtual instances on the same physical machine. In other words, one or more of the DCSM device 202, the server devices 204(1)-204(n), or the client devices 208(1)-208(n) may operate on the same physical device rather than as separate devices communicating through communication network(s) 210. Additionally, there may be more or fewer DCSM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
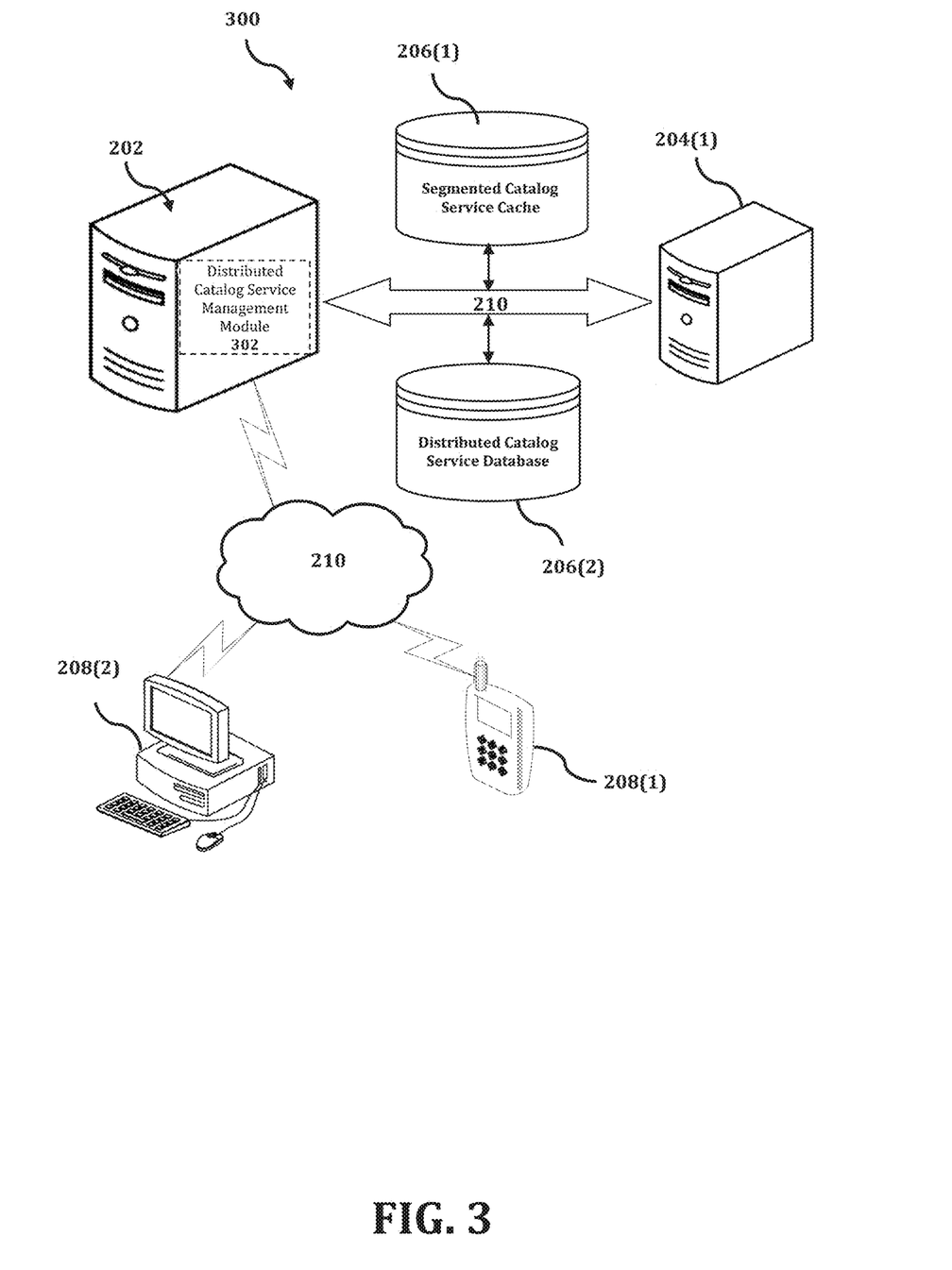
FIG. 3 shows an exemplary system for implementing a method for facilitating a distributed catalog service that manages enriched asset data via a federated blockchain.

The DCSM device 202 is described and shown in FIG. 3 as including a distributed catalog service management module 302, although it may include other rules, policies, modules, databases, or applications, for example. As will be described below, the distributed catalog service management module 302 is configured to implement a method for facilitating a distributed catalog service that manages enriched asset data via a federated blockchain.

An exemplary process 300 for implementing a mechanism for facilitating a distributed catalog service that manages enriched asset data via a federated blockchain by utilizing the network environment of FIG. 2 is shown as being executed in FIG. 3. Specifically, a first client device 208(1) and a second client device 208(2) are illustrated as being in communication with DCSM device 202. In this regard, the first client device 208(1) and the second client device 208(2) may be "clients" of the DCSM device 202 and are described herein as such. Nevertheless, it is to be known and understood that the first client device 208(1) and/or the second client device 208(2) need not necessarily be "clients" of the DCSM device 202, or any entity described in association therewith herein. Any additional or alternative relationship may exist between either or both of the first client device 208(1) and the second client device 208(2) and the DCSM device 202, or no relationship may exist.

Further, DCSM device 202 is illustrated as being able to access a segmented catalog service cache 206(1) and a distributed catalog service database 206(2). The distributed catalog service management module 302 may be configured to access these databases for implementing a method for facilitating a distributed catalog service that manages enriched asset data via a federated blockchain.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DCSM device 202 via broadband or cellular communication. Of course, these embodiments are merely exemplary and are not limiting or exhaustive.

Upon being started, the distributed catalog service management module 302 executes a process for facilitating a distributed catalog service that manages enriched asset data via a federated blockchain. An exemplary process for facilitating a distributed catalog service that manages enriched asset data via a federated blockchain is generally indicated at flowchart 400 in FIG. 4.

Figure 4:
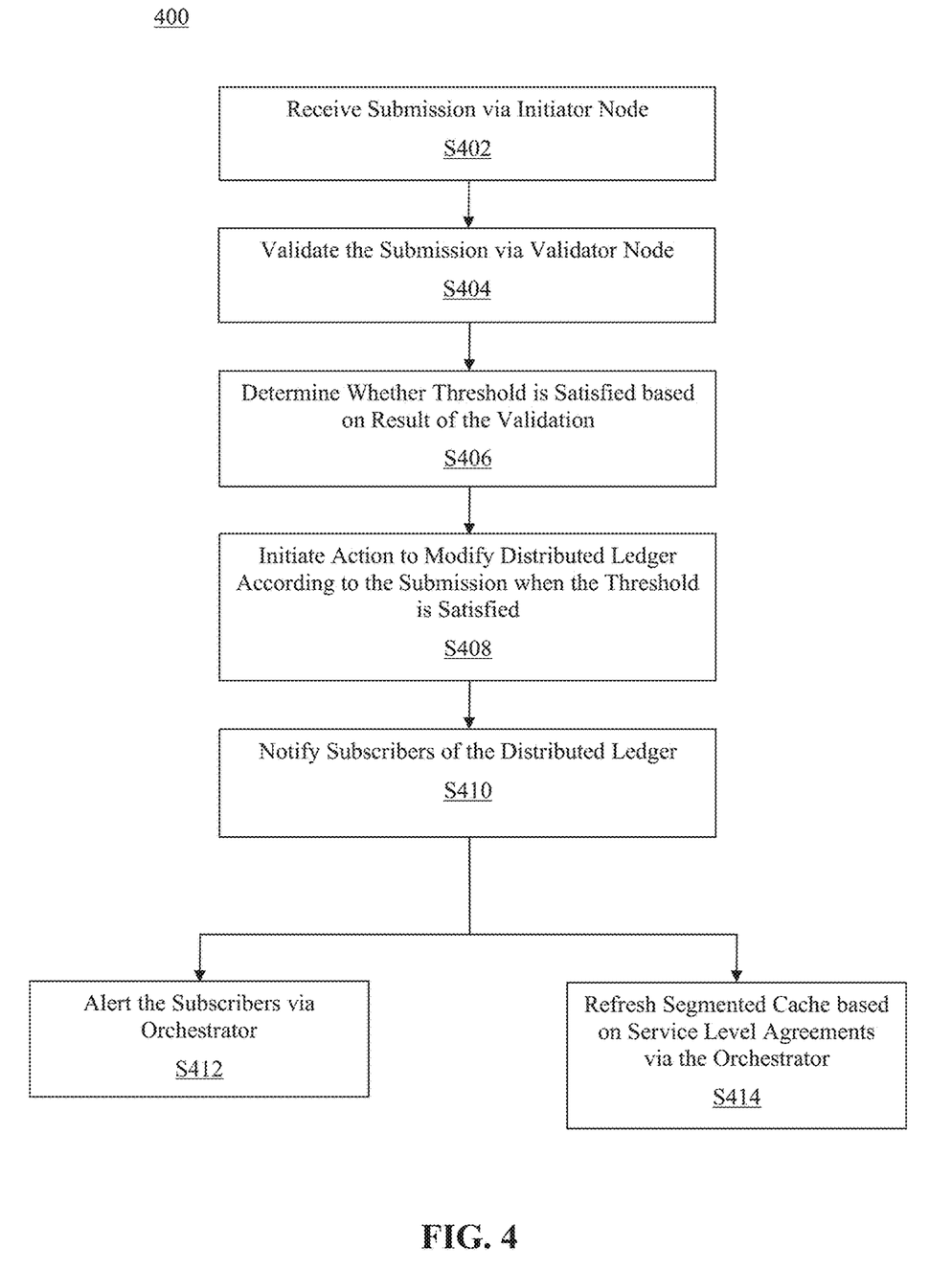
FIG. 4 is a flowchart of an exemplary process for implementing a method for facilitating a distributed catalog service that manages enriched asset data via a federated blockchain.

In the process 400 of FIG. 4, at step S402, a submission may be received via initiators. The initiators may correspond to at least one node from among a plurality of nodes of a distributed ledger. In an exemplary embodiment, the submission may relate to a request to manipulate data in the distributed ledger. The request may include support data such as, for example, evidence data as well as at least one from among a first request to add a new data item to the distributed ledger and a second request to update an existing data item in the distributed ledger. In another exemplary embodiment, the support data may be classified based on the information type. For example, the supporting evidence data may be classified as trusted information or as requiring additional verification based on the information type.

In another exemplary embodiment, the first request to add a new data item may correspond to a request to add new information to the distributed ledger. The new information may relate to any combination of new product information, new product vendor information, and new metadata information such as, for example, new evidence information. For example, the first request may correspond to any combination of new software information from a new vendor, new software information from an existing vendor, new core reference data for a product, and new value-added reference data for the product.

In another exemplary embodiment, the new core reference data may include tech lifecycle management data, current asset metadata after vendor mergers and/or acquisitions, and hosting type data. Likewise, the new value-added reference data may include product feature data such as, for example, code database information and database connectivity tools data; modernizable data such as, for example, virtualization data, cloud enabled data, hosting platform data, and cloud provider data; compliance data such as, for example, WCAG data; as well as data infiltration/exfiltration risk data such as, for example, configuration data to avert a risk.

In another exemplary embodiment, the second request to update an existing data item may correspond to a request to amend existing data in the distributed ledger with updated information. The updated information may relate to any combination of updated product information, updated product vendor information, and updated metadata information such as, for example, updated evidence information. For example, the second request may correspond to any combination of updated software information from an existing vendor, updated core reference data for a product, and updated value-added reference data for the product.

In another exemplary embodiment, the updated core reference data may include tech lifecycle management data, current asset metadata after vendor mergers and/or acquisitions, and hosting type data. Likewise, the updated value-added reference data may include product feature data such as, for example, code database information and database connectivity tools data; modernizable data such as, for example, virtualization data, cloud enabled data, hosting platform data, and cloud provider data; compliance data such as, for example, Web Content Accessibility Guidelines (WCAG) data; as well as data infiltration/exfiltration risk data such as, for example, configuration data to avert a risk.

In another exemplary embodiment, the evidence data may relate to available body of facts that indicate whether the new information and/or the updated information reflect a valid proposition. The evidence data may include information that corresponds to a vendor and/or a product in the distributed ledger. For example, evidence that a software product is WCAG compliant may include corresponding product information on a vendor website, a vendor product brochure, and vendor newsletter.

In another exemplary embodiment, the initiators may correspond to at least one node from among a plurality of nodes of a distributed ledger. The initiators may relate to a trusted contributing partner that initiates the addition of new information and/or the updating of existing information in the distributed ledger. For example, the initiators may initiate an update for a specific vendor data item as part of a business-as-usual process.

In another exemplary embodiment, the initiators may correspond to a network of sub-nodes that facilitate usage of the catalog service consistent with disclosures in the present application. The network of sub-nodes may include consumption sub-nodes as well as validator sub-nodes. In another exemplary embodiment, the submission may be verified by the initiator via the corresponding validator sub-nodes prior to disbursement to other trusted contributing partners. For example, validator sub-nodes of the initiator may receive a new catalog entry from within the network and validate included data based on defined sets of business rules as well as corresponding evidence data before sharing the validated new catalog entry to the other trusted contributing partners.

In another exemplary embodiment, the distributed ledger may include databases that are spread across the plurality of nodes on a peer-to-peer network. Each node on the peer-to-peer network replicates and saves an identical copy of a ledger and updates itself independently without input from a central administrator. In another exemplary embodiment, when a ledger update is requested, each node may construct a new transaction in the ledger. Each node may then utilize a consensus algorithm to determine which of the newly generated transactions most accurately represent the requested ledger update. Based on a result of the determination, all the nodes in the peer-to-peer network may update their own ledgers with the agreed upon new transaction. As will be appreciated by a person of ordinary skill in the art, the communication between each of the nodes may be secured via cryptographic keys and electronic signatures.

In another exemplary embodiment, the distributed ledger may relate to a blockchain that includes a plurality of blocks corresponding to a growing list of records. Each of the plurality of blocks on the blockchain may include digital pieces of information such as, for example, product information and vendor information. Each of the plurality of blocks on the blockchain may also include identifying data which distinguishes a particular block from other blocks on the blockchain. In another exemplary embodiment, each block may utilize a unique code such as, for example, a hash as identifying data. The hashes may include cryptographic codes that are automatically generated by an algorithm.

In another exemplary embodiment, after a consensus of the plurality of nodes, the new information and/or updated information may be verified and confirmed. Then, the new information and/or the updated information may be stored in a block. In another exemplary embodiment, product data from a plurality of vendors may be packaged together in a single block. Once a block has been compiled, a hash unique to the block may be automatically generated and encoded within the block. In another exemplary embodiment, a hash value of a preceding block may also be encoded within the block. Finally, the compiled block may then be added to the blockchain.

In another exemplary embodiment, the distributed ledger may correspond to a federated blockchain that includes a plurality of pre-selected participants. The plurality of pre-selected participants may include the initiators and the validators. In another exemplary embodiment, the federated blockchain may include a plurality of blocks corresponding to a growing list of records that is shared amongst a consortium of the pre-selected participants. As such, the federated blockchain may not be open to the public and is semi-private based on the pre-selected participants. In another exemplary embodiment, the semi-private nature of the federated blockchain limits modification of the blockchain to the pre-selected participants to ensure that data quality is maintained according to a standard that is agreed upon by the pre-selected participants. Additionally, the semi-private nature of the federated blockchain enables the leveraging of the blockchain as a service to subscribers consistent with present disclosures.

In another exemplary embodiment, pre-selected participants may correspond to the trusted contributing partners consistent with present disclosures. Additional participants may be added as new trusted contributing partners based on predetermined criterions such as, for example, business criterions and regulatory criterions.

At step S404, the submission may be validated via validators. The validators may correspond to at least one other node from among the plurality of nodes of the distributed ledger. In an exemplary embodiment, the validators may include trusted contributing partners other than the initiators who initiated the submission. The validators may correspond to trusted contributing partners that validate the new information and/or the updated information for inclusion in the distributed ledger. For example, the validators may confirm an update for a specific vendor data item in the submission from an initiator.

In another exemplary embodiment, the submission may be validated based on at least one from among a predetermined guideline and the evidence data from the submission. The predetermined guideline may relate to a defined set of business rules and/or regulations that govern the management of data in the catalog service. In another exemplary embodiment, the submission may be automatically validated and manually validated by the validators based on the predetermined guideline and the evidence data. The automated validation process may include use of artificial intelligence computing techniques such as, for example, natural language processing and machine learning models.

At step S406, a determination may be made as to whether a threshold is satisfied based on a result of the validating. In an exemplary embodiment, the threshold may include a predetermined number of approvals from the validators that indicate a consensus of the plurality of nodes. The threshold may be based on a predetermined business guideline that governs storage of data in the catalog service. In another exemplary embodiment, the threshold may indicate a required number of approvals by the validators before the new information and/or the updated information is included in the distributed ledger. The required number of approvals may correspond to a specific amount such as, for example, that eighty out of a hundred validators approved, a specific percentage such as, for example, that eighty percent of the validators approved, agreement by a majority of the validators, and a unanimous agreement by all of the validators.

In another exemplary embodiment, the result of the validation may include at least one from among an approval response, a rejection response, and an abstention response from the validators. The validators may provide the approval response in reply to a successful validation of the submission. Likewise, the validators may provide a rejection response in reply to an unsuccessful validation of the submission. Moreover, the validators may provide an abstention response in reply to a submission where the outcome is uncertain. For example, a validator may provide an abstention response when business guidelines specific to the validator indicate that additional evidence data may be required for the validation.

At step S408, an action may be initiated when the threshold is satisfied. The action may include a modification of the distributed ledger at each of the plurality of nodes according to the submission. In an exemplary embodiment, the action may be used to push new information and/or updated information to the catalog service stored at each of the plurality of nodes that make up the distributed ledger. Including the new information and/or the updated information in the catalog service at each of the plurality of nodes may ensure a consistent distributed ledger. As will be appreciated by a person of ordinary skill in the art, the consistent distributed ledger provides a single, reliable source of commercial catalog service that is current, accurate, and comprehensive for each of the plurality of nodes.

At step S410, subscribers of the distributed ledger may be notified. In an exemplary embodiment, the subscribers of the distributed ledger may include entities who may consume data from the distributed ledger but may not perform functions to modify the distributed ledger. The functions that modify the distributed ledger may include initiating a submission and validating the submission. In another exemplary embodiment, the subscribers may be outside of the trusted perimeter. For example, the subscribers may include consuming partners that are outside of the consortium perimeter.

In another exemplary embodiment, to notify the subscribers, an alert may be generated via an event-based orchestrator for each of the subscribers at step S412. The alert may include information that relates to the initiated action. Then, at step S414, a cache may be refreshed via the event-based orchestrator with the modified distributed ledger based on a service level agreement (SLA) that corresponds to each of the subscribers. The cache may be segmented into data delivery tiers based on the SLA. The data delivery tiers may include an immediate data delivery tier, a weekly data delivery tier, a monthly data delivery tier, and a quarterly data delivery tier. Consistent with present disclosures, the data delivery tiers may be represented as a platinum tier, a gold tier, a silver tier, and a standard tier, respectively. Finally, the alert may be transmitted to the subscribers according to preferences in the SLA. For example, subscriber A may prefer that the alert is transmitted as an electronic message to a specific computing device.

In an exemplary use case, to add new software from a new vendor, an initiator of contributing partner A may notice that a recent software entry to the marketplace is missing in the catalog service as part of a business-as-usual (BAU) process. The initiator may add the new software, which is from a vendor currently not in the catalog. The initiator may submit the update to a catalog of contributing partner A with evidence when available. The validator A of contributing partner A may receive the new catalog entry from within the network. The validator A may validate the data based on defined set of business rules and the evidence. The validator A may share the validated record to other contributing partners for validations.

A validator B of contributing partner B may receive the newly assed catalog entry submitted for validation by contributing partner A. The validator B may validate the data based on defined sets of business rules and evidence when available. The validator B may approve/reject/abstain the newly added record. When approved, the newly added record may be added to the catalog service and all nodes within the trusted perimeter received the newly added software.

Consistent with present disclosures, an orchestrator may notify subscribers of the new catalog entry. The segmented cache may be updated based on SLAs corresponding to each of the subscribers. Once updated, the new catalog entry is available for consumption by the subscribers consistent with the SLA.

In another exemplary use case, to add new software from an existing vendor, an initiator of contributing partner A may notice that the catalog service is missing a software released by an existing vendor as part of a business-as-usual (BAU) process. The initiator may add the new software and associate the new software with the existing vendor. The initiator may submit the update to a catalog of contributing partner A with evidence when available. The validator A of contributing partner A may receive the new catalog entry from within the network. The validator A may validate the data based on defined set of business rules and the evidence. The validator A may share the validated record to other contributing partners for validations.

A validator B of contributing partner B may receive the newly assed catalog entry submitted for validation by contributing partner A. The validator B may validate the data based on defined sets of business rules and evidence when available. The validator B may approve/reject/abstain the newly added record. When approved, the newly added record may be added to the catalog service and all nodes within the trusted perimeter received the newly added software.

Consistent with present disclosures, an orchestrator may notify subscribers of the new catalog entry. The segmented cache may be updated based on SLAs corresponding to each of the subscribers. Once updated, the new catalog entry is available for consumption by the subscribers consistent with the SLA.

In another exemplary use case, to add core reference data, an initiator of contributing partner A may notice that a vendor end of standard support date for a software product is not in the catalog service but was recently published on a vendor web site as part of a business-as-usual (BAU) process. The initiator may update the core software reference data to include the date. The initiator may submit the update to a catalog of contributing partner A with evidence when available. The validator A of contributing partner A may receive the new catalog entry from within the network. The validator A may validate the data based on defined set of business rules and the evidence. The validator A may share the validated record to other contributing partners for validations.

A validator B of contributing partner B may receive the newly assed catalog entry submitted for validation by contributing partner A. The validator B may validate the data based on defined sets of business rules and evidence when available. The validator B may approve/reject/abstain the newly added record. When approved, the newly added record may be added to the catalog service and all nodes within the trusted perimeter received the newly added software.

Consistent with present disclosures, an orchestrator may notify subscribers of the new catalog entry. The segmented cache may be updated based on SLAs corresponding to each of the subscribers. Once updated, the new catalog entry is available for consumption by the subscribers consistent with the SLA.

In an exemplary use case, to add value added reference data, an initiator of contributing partner A may notice that a software in the catalog service is WCAG compliant based on information on a vendor website as part of a business-as-usual (BAU) process. The initiator may update the software profile to include the compliance information as value-added data. The initiator may submit the update to a catalog of contributing partner A with evidence when available. The validator A of contributing partner A may receive the new catalog entry from within the network. The validator A may validate the data based on defined set of business rules and the evidence. The validator A may share the validated record to other contributing partners for validations.

A validator B of contributing partner B may receive the newly assed catalog entry submitted for validation by contributing partner A. The validator B may validate the data based on defined sets of business rules and evidence when available. The validator B may approve/reject/abstain the newly added record. When approved, the newly added record may be added to the catalog service and all nodes within the trusted perimeter received the newly added software.

Consistent with present disclosures, an orchestrator may notify subscribers of the new catalog entry. The segmented cache may be updated based on SLAs corresponding to each of the subscribers. Once updated, the new catalog entry is available for consumption by the subscribers consistent with the SLA.

Figure 5:
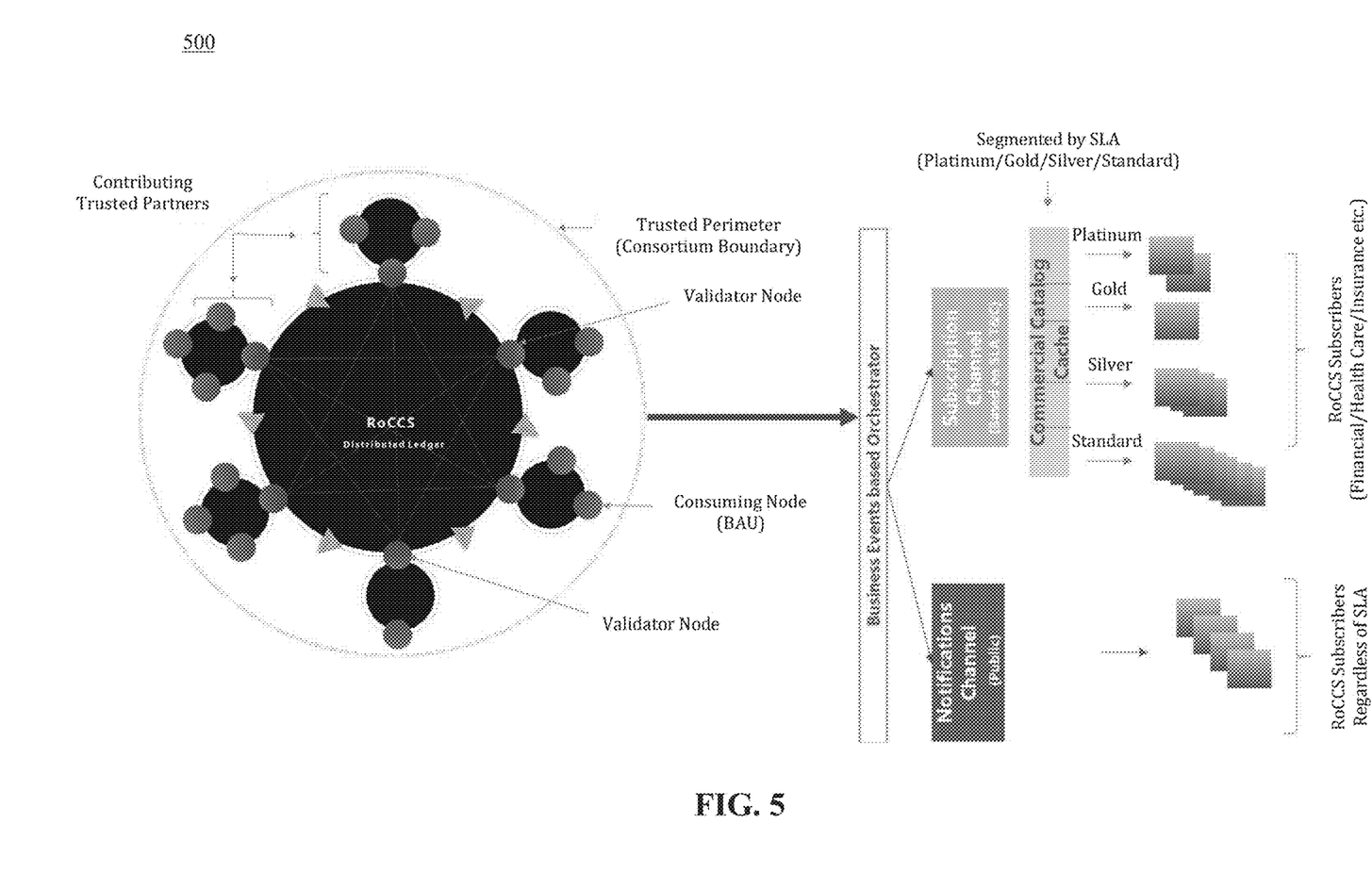
FIG. 5 is a design and flow diagram of an exemplary process for implementing a method for facilitating a distributed catalog service that manages enriched asset data via a federated blockchain.

FIG. 5 is a design and flow diagram 500 of an exemplary process for implementing a method for facilitating a distributed catalog service that manages enriched asset data via a federated blockchain. In FIG. 5, validator nodes in the trusted perimeter may initiate and/or receive updates as well as validate updates from other validator nodes. Consuming nodes in the trusted perimeter may initiate and/or receive updates from a corresponding validator node as well as from other validator nodes. Subscribers outside of the trusted perimeter may correspond to consumption partners outside of the consortium perimeter. Orchestrators in the trusted perimeter may orchestrate business events, notify the subscribers according to SLAs, and publish updates to the subscribers.

As illustrated in FIG. 5, a consortium of contributing trusted partners is within the trusted perimeter. Consistent with present disclosures, a contributing trusted partner may initiate updates for a vendor catalog item as part of a BAU process. The update may be validated by a validator node of the contributing trusted partner. Then, the update may be submitted to other consortium members for validation. Once the update is validated by the other contributing trusted partners, the update may be saved to the catalog service database.

Consistent with present disclosures, the subscribers are outside of the trusted perimeter. An orchestrator may receive the validated updates and notify the subscribers of the validated update. The orchestrator may refresh the segmented cache based on SLAs of the subscribers. The SLAs may classify subscribers as a platinum subscriber who receives validated updates immediately, as a gold subscriber who receives validated updates on a weekly basis, as a silver subscriber who receives validated updates on a monthly basis, and as a standard subscriber who receives validated updates on a quarterly basis. Then, the subscribers may consume the validated data based on the SLA and the classification.

Accordingly, with this technology, an optimized process for facilitating a distributed catalog service that manages enriched asset data via a federated blockchain is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating a distributed catalog service via a blockchain, the method being implemented by at least one processor, the method comprising:

receiving, by the at least one processor via at least one initiator, at least one submission, the at least one initiator corresponding to at least one node from among a plurality of nodes of a distributed ledger;

validating, by the at least one processor via at least one validator, the at least one submission, the at least one validator corresponding to at least one other node from among the plurality of nodes of the distributed ledger;

determining, by the at least one processor, whether at least one threshold is satisfied based on a result of the validating;

initiating, by the at least one processor, at least one action when the at least one threshold is satisfied, the at least one action including a modification of the distributed ledger at each of the plurality of nodes according to the at least one submission; and notifying, by the at least one processor, at least one subscriber of the distributed ledger by, generating, by the at least one processor, at least one alert for each of the at least one subscriber, the at least one alert including information that relates to the initiated at least one action;

refreshing, by the at least one processor, at least one cache with the modified distributed ledger based on a service level agreement that corresponds to each of the at least one subscriber; and transmitting, by the at least one processor, the at least one alert to the at least one subscriber.

2. The method of claim 1, wherein the at least one cache is segmented into at least one data delivery tier based on the service level agreement, the at least one data delivery tier including an immediate data delivery tier, a weekly data delivery tier, a monthly data delivery tier, and a quarterly data delivery tier.

3. The method of claim 1, wherein the at least one submission relates to a request to manipulate data in the distributed ledger, the request including evidence data and at least one from among a first request to add a new data item to the distributed ledger and a second request to update an existing data item in the distributed ledger.

4. The method of claim 1, wherein the at least one submission is verified by the at least one initiator prior to the receiving.

5. The method of claim 1, wherein the distributed ledger corresponds to a federated blockchain that includes a plurality of pre-selected participants, the plurality of pre-selected participants including the at least one initiator and the at least one validator.

6. The method of claim 1, wherein the at least one submission is validated based on at least one predetermined guideline and evidence data from the at least one submission.

7. The method of claim 1, wherein the result of the validation includes at least one from among an approval response, a rejection response, and an abstention response from the at least one validator.

8. The method of claim 1, wherein the at least one threshold includes a predetermined number of approvals from the at least one validator that indicate a consensus of the plurality of nodes.

9. A computing device configured to implement an execution of a method for facilitating a distributed catalog service via a blockchain, the computing device comprising:

a processor;

a memory; and a communication interface coupled to each of the processor and the memory, wherein the processor is configured to:

receive, via at least one initiator, at least one submission, the at least one initiator corresponding to at least one node from among a plurality of nodes of a distributed ledger;

validate, via at least one validator, the at least one submission, the at least one validator corresponding to at least one other node from among the plurality of nodes of the distributed ledger;

determine whether at least one threshold is satisfied based on a result of the validating;

initiate at least one action when the at least one threshold is satisfied, the at least one action including a modification of the distributed ledger at each of the plurality of nodes according to the at least one submission; and notify at least one subscriber of the distributed ledger by further configuring the processor to:

generate at least one alert for each of the at least one subscriber, the at least one alert including information that relates to the initiated at least one action;

refresh at least one cache with the modified distributed ledger based on a service level agreement that corresponds to each of the at least one subscriber; and transmit the at least one alert to the at least one subscriber.

10. The computing device of claim 9, wherein the processor is further configured to segment the at least one cache into at least one data delivery tier based on the service level agreement, the at least one data delivery tier including an immediate data delivery tier, a weekly data delivery tier, a monthly data delivery tier, and a quarterly data delivery tier.

11. The computing device of claim 9, wherein the at least one submission relates to a request to manipulate data in the distributed ledger, the request including evidence data and at least one from among a first request to add a new data item to the distributed ledger and a second request to update an existing data item in the distributed ledger.

12. The computing device of claim 9, wherein the processor is further configured to verify the at least one submission via the at least one initiator prior to the receiving.

13. The computing device of claim 9, wherein the distributed ledger corresponds to a federated blockchain that includes a plurality of pre-selected participants, the plurality of pre-selected participants including the at least one initiator and the at least one validator.

14. The computing device of claim 9, wherein the processor is further configured to validate the at least one submission based on at least one predetermined guideline and evidence data from the at least one submission.

15. The computing device of claim 9, wherein the result of the validation includes at least one from among an approval response, a rejection response, and an abstention response from the at least one validator.

16. The computing device of claim 9, wherein the at least one threshold includes a predetermined number of approvals from the at least one validator that indicate a consensus of the plurality of nodes.

17. A non-transitory computer readable storage medium storing instructions for facilitating a distributed catalog service via a blockchain, the storage medium comprising executable code which, when executed by a processor, causes the processor to:

receive, via at least one initiator, at least one submission, the at least one initiator corresponding to at least one node from among a plurality of nodes of a distributed ledger;

validate, via at least one validator, the at least one submission, the at least one validator corresponding to at least one other node from among the plurality of nodes of the distributed ledger;

determine whether at least one threshold is satisfied based on a result of the validating;

initiate at least one action when the at least one threshold is satisfied, the at least one action including a modification of the distributed ledger at each of the plurality of nodes according to the at least one submission; and notify at least one subscriber of the distributed ledger by further causing the processor to:

generate at least one alert for each of the at least one subscriber, the at least one alert including information that relates to the initiated at least one action;

refresh at least one cache with the modified distributed ledger based on a service level agreement that corresponds to each of the at least one subscriber; and transmit the at least one alert to the at least one subscriber.

* * * * *